Aug. 3, 1954

E. R. PRICE 2,685,170

POWER ASSISTED ACTUATOR

Filed June 12, 1950

INVENTOR.
EARL R. PRICE
BY
T. J. Plante
ATTORNEY

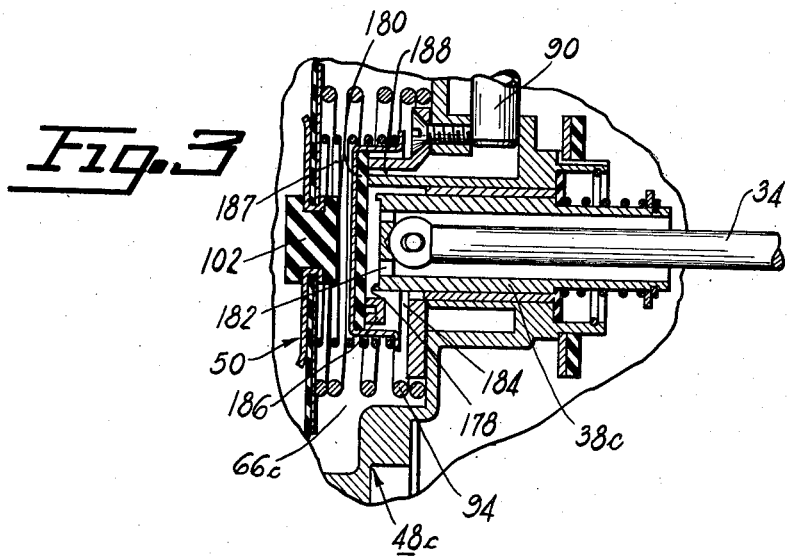
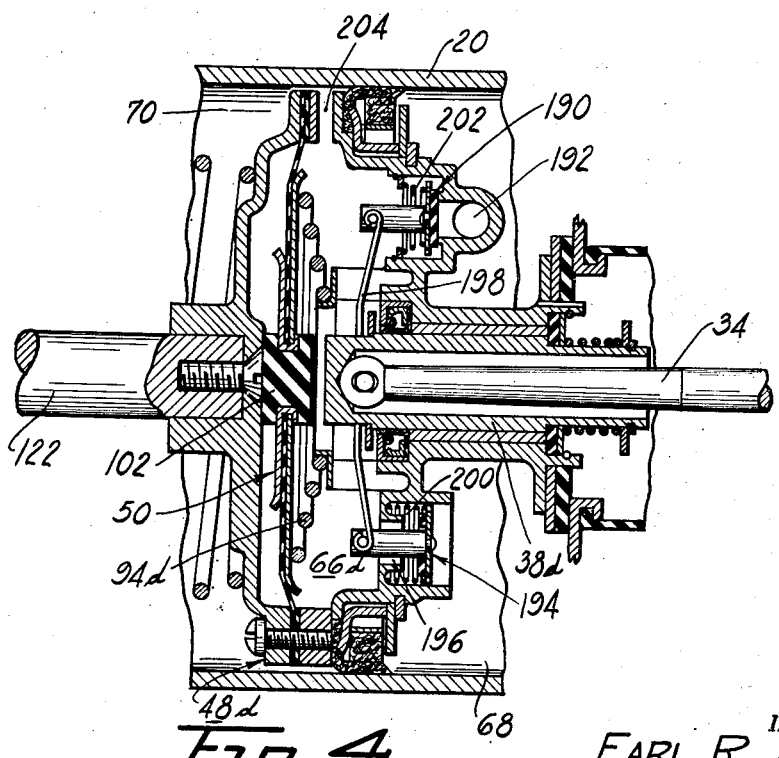

Aug. 3, 1954
E. R. PRICE
2,685,170
POWER ASSISTED ACTUATOR
Filed June 12, 1950
4 Sheets-Sheet 4
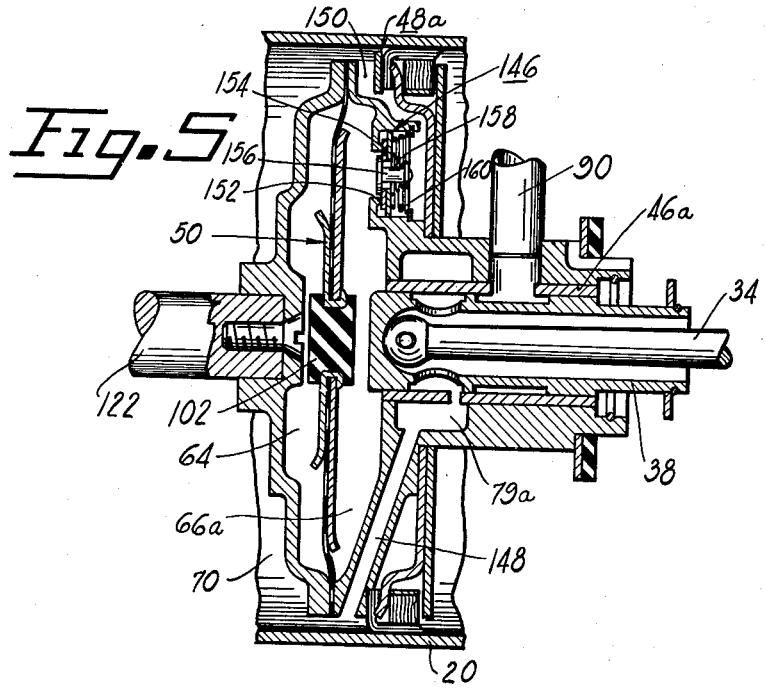
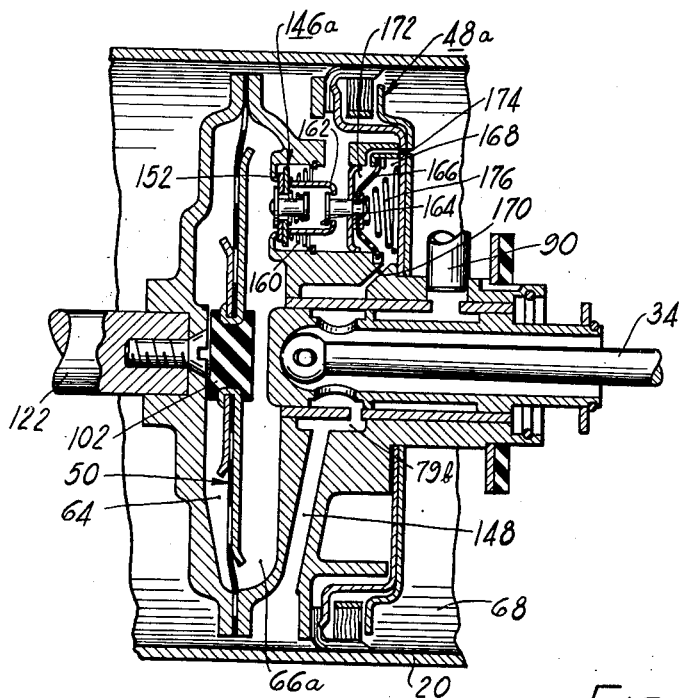
INVENTOR.
EARL R. PRICE
BY
T. J. Plante
ATTORNEY Patented Aug. 3, 1954

2,685,170

UNITED STATES PATENT OFFICE 2,685,170

POWER ASSISTED ACTUATOR

Earl R. Price, South Bend, Ind., assignor to Bendix Aviation Corporation, South Bend, Ind., a corporation of Delaware Application June 12, 1950, Serial No. 167,681

25 Claims. (Cl. 60—54.6)

This invention relates to a power-assisted actuator, i. e. a pressure producing device in which physical operating force is supplemented by power assistance. The device is intended primarily as an actuator for a vehicle brake system, although other uses are possible.

Since a very high percentage of modern vehicle brake systems utilize hydraulic pressure-transmitting means, the device disclosed herein has been designed primarily for use as an actuator for such systems, although the basic principles disclosed are applicable to systems utilizing force-transmitting means other than hydraulic. A number of power assistor units have heretofore been developed for hydraulic brake systems. Widespread use is being made of assistor units which are entirely divorced from the master cylinders and wheel cylinders of the brake systems, except for the fluid lines leading to and from the assistor units (see, for example, Gates Reissue Patent No. 22,965 and Price Patent No. 2,353,755). Such devices are very convenient, because they can be located at any desired place on the vehicle chassis where sufficient space is available. The only disadvantages of these units are: (a) they limit the extent to which the initial pedal pressure can be reduced, because the master cylinder resistance must be overcome before the valve can be actuated; and (b) they require an additional hydraulic cylinder as part of the power assistor unit.

In general, it is the object of the present invention to provide a commercially acceptable device in which power assistance is applied directly to the primary master cylinder, thereby making possible a greater reduction of the initial pedal pressure, and eliminating the need for an extra hydraulic cylinder. A power-assisted master cylinder unit of this type is particularly desirable for passenger automobiles, since it improves the "feel" and reduces the cost of the brake system, and since the size of a unit having adequate power output is not too large for accommodation in the available space.

I propose to utilize the work of the power assistor to accomplish the two-fold result of reducing the force which the operator has to exert, and, at the same time, reducing the length of pedal stroke. Shortening the stroke makes it possible to use a brake operating treadle having a travel comparable to the travel of the accelerator treadle. It therefore becomes unnecessary for the operator to lift his foot when he wishes to transfer his effort from the accelerator control to the brake control. By pivoting at the heel, the ball of the foot can be transferred from one treadle to the other more quickly and with less effort than it could if a conventional pedal were used.

It is particularly important, in connection with a brake control of the type proposed, that the "feel" be satisfactory to the operator. The stroke of the power-assisted master cylinder must progress smoothly, and must give a reaction which is effectively coordinated with the operation of the braking system.

An important object of the present invention is to provide a power-assisted master cylinder having the desired reaction, or "feel," characteristics. In order to obtain the optimum "feel" characteristics, I propose to use a suitable reaction means, the effective reaction force of which is proportionally related to the effective force of the power cylinder (and therefore to the output pressure of the master cylinder), and to provide means for withholding at least part of the reaction effect of the reaction means during the initial portion of the brake-applying stroke. In this context, the phrase "initial portion of the brake-applying stroke" means that portion of the stroke which is required to develop a predetermined output pressure in the master cylinder corresponding to the resistance encountered in the brake system at or near the point of initiation of deceleration. The pressure of the operator required to initiate braking action is kept as low as possible, subject to the limitation that only a slight deceleration may occur while the reaction effect is being withheld. In other words, the initial treadle pressure is low, so that the weight of the operator's foot can, of itself, cause the shoes to take up a substantial amount of the shoe-to-drum clearance, before the reaction build-up begins. The initial suppression of the reaction effect, followed by a normal reaction build-up as the retarding torque is developed, provides, in effect, a "two-stage" reaction which gives the operator a correct, and at the same time pleasant, "feel" indicative of the progress of the brake application.

The above and other objects and features of the invention will appear more fully hereinafter from a consideration of the following description, taken in connection with the accompanying drawings, wherein a plurality of embodiments of the invention are illustrated by way of example. In the drawings:

Figures 3 and 4 are sectional views showing alternative power piston control valve arrangements which can be substituted for the corresponding portion of the device of Figure 2; and Figures 5 and 6 are sectional views showing alternative means for providing the "two-stage" reaction effect.

Figure 1:
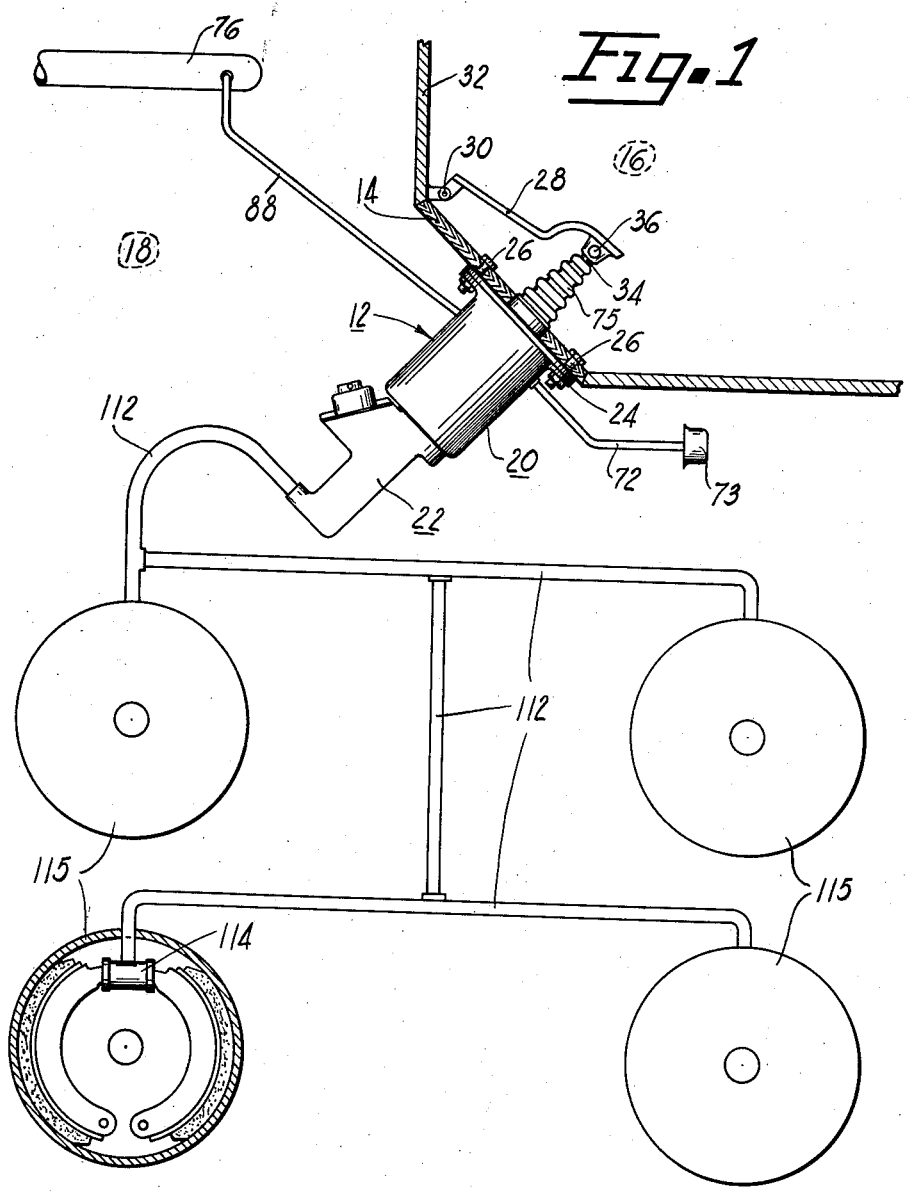
Figure 1 is a view showing the brake-operating system diagrammatically and showing the mounting of the power-assisted master cylinder unit directly against the underside of the toeboard.

As shown in Figure 1, the power-assisted master cylinder unit 12 is secured directly to the engine compartment side of the toeboard 14, the toeboard being the slanting lower portion of the wall which separates the driver's compartment 16 from the engine compartment 18. The power-assisted master cylinder unit comprises a power cylinder 20 and a hydraulic cylinder 22 mounted on the front end of the power cylinder. The power cylinder casing has an integral mounting flange 24 which is secured by fastening members 26 to the toeboard.

The power-assisted master cylinder unit 12 is controlled by a treadle 28, which is pivoted at 30 on the driver's compartment side of the fire wall 32. The treadle may be pivoted at its lower end, similarly to a conventional accelerator treadle, if preferred. A control rod 34 is pivotally connected at 36 to the treadle 28, and extends into the power-assisted master cylinder unit to control its operation.

Figure 2:
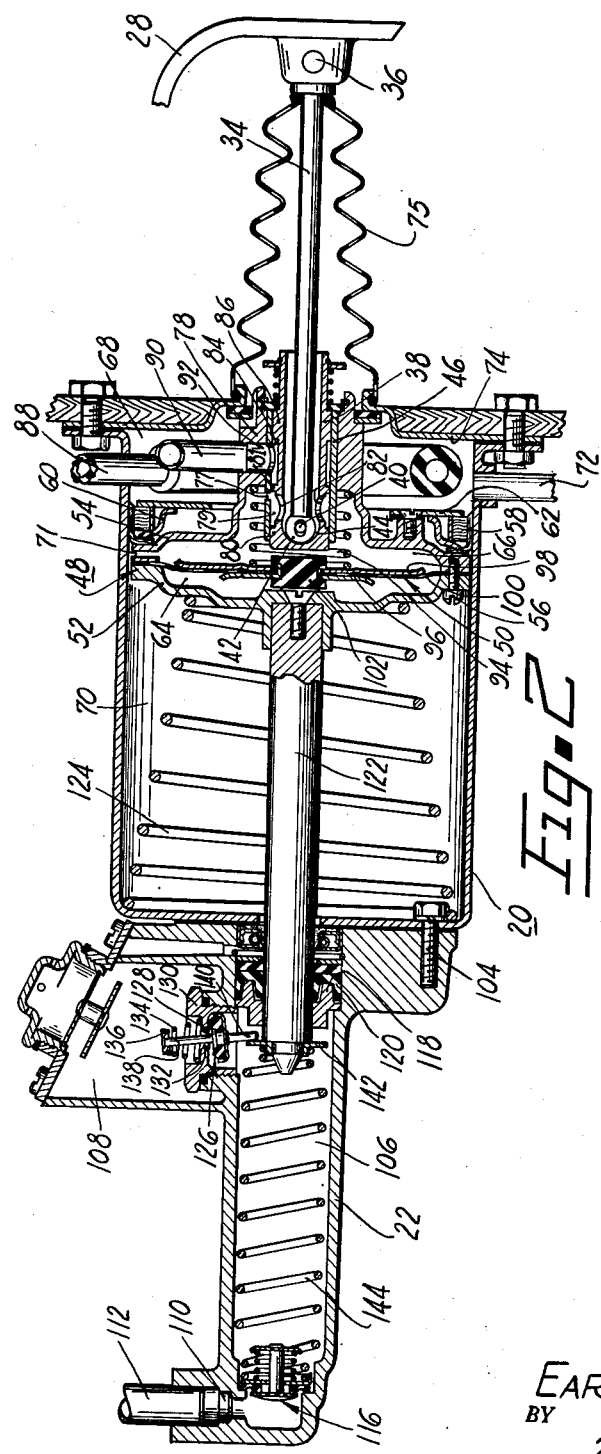
Figure 2 is a sectional view showing the internal construction of the preferred embodiment of my improved power-assisted master cylinder unit.

As shown in Figure 2, the left end of control rod 34 operatively engages a valve control member 38. The rod is connected to the valve control member by a lost motion pin-and-slot connection 40, the applying force on the pressure stroke being transferred directly from the ball-shaped end 42 of the rod to the bottom of the spherical recess 44 provided in the valve control member. In the valve arrangement of Figure 2, the valve control member 38 is in the form of a slide valve which cooperates with a sleeve 46 to control operation of the power piston.

Power piston 48 provides a pressure-responsive movable wall, which is reciprocably mounted in power cylinder 20, and which carries a reaction diaphragm 50. The portion of the power piston which encloses the diaphragm comprises two plates 52 and 54, which are peripherally joined together by fastening members 56, the outer edge of diaphragm 50 being clamped between the two piston plates. A suitable packing 58 is supported on the periphery of the power piston, the packing being held in place between plate 54 and a spacer 60 which is clamped against the packing by a plate 62. Reaction diaphragm 50 divides the chamber provided between piston plates 52 and 54 into two compartments 64 and 66. The front compartment 64 is continuously in communication with chamber 68 at the rear of the power cylinder piston (the passage is not shown), and the rear compartment 66 is continuously in communication with chamber 70 in front of the power cylinder piston, through passage 71.

Although any desired type of power device may be used, I prefer to use a differential air pressure power cylinder of the vacuum type, in which the unit is "atmosphere-suspended" when released. Accordingly, chamber 68 and compartment 64 are permanently connected to the atmosphere, preferably through a conduit 72 connected to an air cleaner 73. The rear of the power cylinder could be left open, but cover plate 74 and boot 75 are used to prevent dust and dirt from getting into the interior of the power cylinder.

Valve member 38 selectively controls the communication of compartment 66 (hence also chamber 70) with either the atmosphere in chamber 68, or the vacuum source, such as the usual intake manifold 76. In the position shown, chamber 66 is connected through port 77 in sleeve 46 (which is rigidly mounted in an extension 78 provided on the rear of piston plate 54) with the annular recess 79 provided between the lands 80 and 81 of valve member 38. Recess 79 is open to chamber 68 through ports 82, the hollow center of the valve member, and the interior of boot 75. When valve member 38 is moved toward the left, land 81 first cuts off port 77 from recess 79, and thereafter connects port 77 to annular recess 84, provided between lands 81 and 86. Communication is thus established between chamber 66 (which communicates with chamber 70) and the vacuum source, which is connected to recess 84 by conduit 88, coiled hose 90, and port 92.

In the embodiment of the invention shown in Figure 2, reaction diaphragm 50 is urged away from valve control member 38 by means of a compression spring 94, one end of which engages the diaphragm, and the other end of which engages plate 54 of the power piston. The spring provides a "counter-reaction force," which prevents the diaphragm reaction member from exerting a reaction force against the operator during the initial portion of the brake-applying stroke. The reaction diaphragm may consist of two metal plates 96 and 98 pressing against opposite sides of a flexible sealing member 100. A rubber button 102 is mounted in the center of the diaphragm to cushion the engagement of the diaphragm with the valve control member, which occurs when the force of the counter-reaction spring is overcome by the diaphragm.

The hydraulic cylinder 22, which is secured to the front of the power cylinder by a plurality of fastening members 104, contains a pressure chamber 106 and a reservoir chamber 108. The front end of the pressure chamber has a discharge port 110 which communicates through conduits 112 with the wheel cylinders 114 of brake assemblies 115 (see Figure 1). The usual residual pressure check valve 116 is located in the front end of the pressure chamber of the master cylinder. The other end of the master cylinder pressure chamber is partially closed by an annular flange member or bushing 118, which provides a seat for the base of a U-section annular rubber seal 120.

One end of a pressure-transmitting member in the form of a rod 122 is in operative engagement with the power piston, and the other end of the rod extends through the seal 120 into hydraulic pressure chamber 106. The pressure-transmitting member 122 is adapted to displace liquid under pressure from chamber 106, thereby causing pressure to be exerted in the wheel cylinders 114. The power piston 48 and the member 122 are urged toward retracted position by a spring 124.

Communication between reservoir chamber 108 and pressure chamber 106 is controlled by a valve element 126, which is adapted to seat against a flange 128 on plug 130 to prevent flow of liquid through port 132 into the reservoir chamber 108. Valve element 126 is urged to seat by a spring 134, which acts on a collar 136 carried by the valve stem 138. The other end 140 of the valve stem extends into the hydraulic pressure chamber, and is engaged, when the power piston is in retracted position, by a valve-unseating projection 142, which is provided on the end of pressure-transmitting member 122. A convenient and inexpensive projection is obtained by utilizing a separate collar, as shown, held in position on member 122 by the same spring 144 which seats the check valve 116. When projecting collar 142 engages the lower end 140 of the valve stem, the valve is tilted, as shown, to permit free communication between pressure chamber 106 and reservoir chamber 108.

When the operator wishes to apply the brakes, he presses on treadle 28, thereby acting through rod 34 on valve control member 38. Movement of the valve control member toward the left causes air to be evacuated from chamber 70, thereby developing a pressure differential over power piston 48. The force of the power piston acts on pressure-transmitting member 122 to develop pressure in chamber 106 and in the wheel cylinders. The same pressure differential which acts on piston 48 also acts on diaphragm 50, but in the opposite direction. The force exerted by the diaphragm is, of course, less than that exerted by the power piston, because its effective area is smaller.

Until the force developed by the pressure differential acting on diaphragm 50 is sufficient to overcome counter-reaction spring 94, the diaphragm does not exert a reaction force against the operator of the vehicle. The initial increment of diaphragm force is neutralized by being transmitted through spring 94 to the rear portion of the power piston. In order to obtain the most satisfactory "feel," from a practical standpoint, I prefer to use a counter-reaction spring having a strength which permits the weight of the operator's foot to overcome most, or all, of the shoe-to-drum clearance, without, however, obtaining a heavy deceleration effect until the reaction build-up has begun. It is desirable to keep the initial treadle pressure as low as possible, but a definite reaction should be felt when the vehicle attains a deceleration rate caused by appreciable braking torque, in order to prevent over-braking. At the end of the initial low-treadle-pressure stage, the pressure differential acting on diaphragm 50 compresses spring 94 sufficiently to bring the rubber button 102 into engagement with valve control member 38. Further increases of pressure differential in the power cylinder are accompanied by increases in the reaction force which acts against the operator, and which must be overcome by the operator in order to intensify the brake-applying pressure. The "two-stage" reaction provides a "feel" similar to that encountered in the best-designed physically-operated braking systems, in which the initial pedal force required to overcome the brake return springs is very light in relation to the pedal force required to stop the vehicle.

Figures 5 and 6 disclose alternative arrangements for preventing a reaction force from acting against the operator during the initial portion of the brake-applying stroke. In both of the alternative constructions, the change in pressure on the control side of the reaction diaphragm is restricted by a check valve. Referring to Figure 5, communication between compartment 66a (at the rear of reaction diaphragm 50) and valve recess 79a is controlled by a check valve 146. Compartment 66a is not connected directly to recess 79a (as compartment 66 is connected to recess 79 in Figure 2); instead, chamber 70 of the power cylinder is connected to recess 79a by a passage 148, and compartment 66a communicates with chamber 70 through a passage 150 whenever check valve 146 moves away from its seat 152. Check valve 146 comprises an annular valve element 154 which engages seat 152, and a "mushroom" valve element 156 which engages valve element 154. A very light spring 158 seats valve element 156, and a heavier spring 160 seats valve element 154. The light spring 158 permits substantially unrestricted flow of air from chamber 70 into chamber 66a. However, spring 160 keeps check valve 146 closed to prevent flow of air from chamber 66a to chamber 70 during the initial portion of the brake-applying stroke. Until the pressure in chamber 70 and on the right side of check valve 146 has dropped sufficiently to permit the pressure differential acting on the check valve to overcome spring 160, the pressures in chambers 64 and 66a remain balanced, and the diaphragm does not exert a reaction against the operator. When the pressure in chamber 70 has dropped sufficiently to unseat check valve 146, the diaphragm begins to exert a reaction force, but the reaction pressure "lags" behind the power piston pressure throughout the pressure stroke, to the extent of the differential set up by the check valve.

The device shown in Figure 6 also provides a check valve which prevents the reaction member from exerting a reaction force during the initial portion of the brake-applying stroke; and, in addition, a pressure responsive member is provided for the purpose of eliminating the reaction "lag" inherent in the other arrangements. In other words the device of Figure 6 permits the full potential reaction to be felt after the initial low-pressure stage has been completed. Check valve 146a is held on seat 152 by spring 160, as before, but, in addition, the check valve is provided with an extension 162 which is adapted to be engaged by a projection 164 secured to a small diaphragm 166. Chamber 168 at one side of diaphragm 166 is in communication with recess 79b through passage 170, and chamber 172 at the other side of diaphragm 166 is in communication with chamber 68 at the rear of the power piston, through passage 174. Chamber 172 therefore remains open to the atmosphere, and the pressure in chamber 168 varies with the pressure in chamber 70. As in the device of Figure 5, the check valve 146a delays the reaction effect of the diaphragm 50 by remaining seated until a predetermined pressure differential has been developed. Subsequently, when the pressure differential acting on diaphragm 166 (which corresponds to the differential acting on the power piston, but is opposite in direction) overcomes spring 176 and moves the diaphragm toward the right, projection 164 engages extension 162, and check valve 146a is pulled away from its seat, and is held away during the rest of the pressure stroke. Thus, the pressure differential acting on diaphragm 50 becomes the same as that acting on piston 48a, and the full reaction effect of diaphragm 50 is felt by the operator after the initial no-reaction phase of operation has been completed.

The force exerted by the operator in resisting the force of the reaction diaphragm is added to the force of the power piston, and they cooperate in driving rod 122 into the hydraulic pressure chamber (see Figure 2). This additive effect of the physical force may be explained either by saying that force acting on the rear of the floating power piston assembly 48 must act on the rod 122 at the front of the power piston assembly, or by saying that the operator's resistance to the diaphragm reaction makes the diaphragm 50, in effect, a supported base from which the power piston is driven forward by the internal pressure resulting from the differential between the air acting against the rear of power piston plate 52 and the partial vacuum acting on the front of power piston plate 54.

The control valve has the usual follow-up action, since valve member 38 slides in a sleeve which moves with power piston 48. As the power piston moves on its pressure stroke, it tends to overtake, and "lap," the valve control member, unless brake-applying movement of the treadle continues. Whenever the operator removes his force from the treadle, the control valve member is pushed back to the position in which chamber 70 communicates with the atmosphere, and spring 124 is able to return the power piston 48 and rod 122 to retracted position.

If the operator wishes to add physical force, after the full force of the power unit has been developed, or, if there is a power failure, direct force can be exerted through valve control member 38 and button 102 against power piston plate 52.

During the pressure stroke of rod 122, valve 126 is held seated by the pressure in the system. While liquid cannot flow from pressure chamber 106 to reservoir chamber 108 with the valve seated, it can unseat the valve and flow in the reverse direction if a momentary vacuum is developed in chamber 106. When rod 122 nears retracted position, collar 142 tilts valve 126 to reestablish reservoir communication. By utilizing a valve arrangement of this type between the reservoir and the pressure chamber, in combination with a plunger (rod 122) having a smaller effective area than the cross-sectional area of chamber 106, I am able to shorten the unit, a particularly important factor in view of its location in the vehicle, and I am also able to utilize a cylinder bore of convenient diameter. Since the actuating treadle acts directly on the unit, without any leverage advantage, the stroke of the liquid-displacing member has to be correspondingly long, and the diameter of the plunger (or piston) in chamber 106 has to be relatively small. If a standard piston and port-covering cup were used, the bore 106 would have to be as small as the rod 122, and considerably longer than the present bore because of the piston skirt.

Figures 3 and 4 disclose power piston control valves having poppet valve elements, instead of a sliding valve. In the construction disclosed in Figure 3, the valve control member 38c has a valve seat 178 which is adapted to engage a valve element 180 to cut off communication of the atmosphere with chamber 66c (communication is provided in released position by ports 182 in valve control member 38c and passage 184 in power piston 48c). Additional movement of valve control member 38c toward the left unseats valve element 180 from valve seat 186 (toward which it is urged by a spring 187) to uncover recess 188, which communicates with vacuum conduit 90. In all other respects the arrangement is substantially the same as that shown in Figure 2. Force is transmitted from reaction diaphragm 50 to valve control member 38c through valve element 180.

In the device of Figure 4, a valve element 190 controls the vacuum port 192, and a separate valve element 194 controls the atmosphere port 196 (which opens directly into chamber 68 of the power cylinder). Valve elements 190 and 194 are connected to opposite ends of a walking beam 198, the center of which is engaged by valve control member 38d. When the valve control member is moved toward the left, it first seats valve 194, overcoming the force of spring 200, and thereafter unseats valve 190, overcoming the force of spring 202. Unseating valve 190 causes a pressure reduction in chamber 66d, and in chamber 70, which is connected to chamber 66d by passage 204. The pressure differential urges power piston 48d toward the left, and urges diaphragm 50 toward the right, against the force of counter-reaction spring 94d.

In the foregoing specification and in the appended claims, the identifying terms used are intended to convey meanings which include the range of equivalent elements. For example, the term "power cylinder" is intended to mean any casing or chamber having a pressure responsive movable member therein, whether such movable member be a piston, a diaphragm, or something else having the same function. Either of the terms "piston" or "diaphragm" embraces a rigid piston, a flexible diaphragm, or any other pressure responsive movable wall. The words "front" and "rear", and other directional words, are intended to have only relative connotation, for convenience in describing, and are not intended to be interpreted as requiring any particular orientation with respect to external elements.

Although several particular embodiments of my invention have been described, it will be understood by those skilled in the art that the objects of the invention may be attained by the use of constructions different in certain respects from those disclosed without departing from the underlying principles of the invention.

I claim:

1. A pressure producing device, in which physical force is supplemented by power assistance, comprising a differential air pressure power cylinder, a piston reciprocable in the power cylinder, a pressure-transmitting member operatively connected to the power piston, said power piston including two plates which are peripherally joined together and which are arranged to provide a chamber between them, a reaction diaphragm which divides said chamber into front and rear compartments, a first passage adapted to connect the front compartment to the space at the rear of the power piston, a second passage adapted to connect the rear compartment to the space in front of the power piston, a sliding follow-up valve control member reciprocably mounted in the rear portion of the power piston, the valve control member having high and low pressure ports which control the operation of the power piston by virtue of the movements of the valve control member with respect to the power piston, a counter-reaction spring which engages the rear of the diaphragm and the rear portion of the power piston and which tends to prevent the diaphragm from exerting its reactionary force on the valve control member, and an operator operated rod, one end of which acts on the valve control member to control its movements and to add the force exerted by the operator to the force of the power piston acting on the pressure-transmitting member.

2. A pressure producing device, in which physical force is supplemented by power assistance, comprising a differential air pressure power cylinder, a piston reciprocable in the power cylinder, a pressure-transmitting member operatively connected to the power piston, said power piston including two plates which are peripherally joined together and which are arranged to provide a chamber between them, a reaction diaphragm which divides said chamber into front and rear compartments, a first passage adapted to connect the front compartment to the space at the rear of the power piston, a second passage adapted to connect the rear compartment to the space in front of the power piston, a sliding follow-up valve control member reciprocably mounted in the rear portion of the power piston and operatively associated with the reaction diaphragm, the valve control member having high and low pressure ports which control the operation of the power piston by virtue of the movements of the valve control member with respect to the power piston, means tending to prevent the diaphragm from exerting a reaction force on the valve control member during the initial portion of the applying stroke, and an operator operated rod, one end of which acts on the valve control member to control its movements and to add the force exerted by the operator to the force of the power piston acting on the pressure-transmitting member.

3. A pressure producing device, in which physical force is supplemented by power assistance, comprising a differential air pressure power cylinder, a piston reciprocable in the power cylinder, a pressure-transmitting member operatively connected to the power piston, said power piston being so constructed as to provide an internal reaction chamber, a reaction diaphragm which is adapted to provide a reaction effect in opposition to the operator's effort and which divides said chamber into front and rear compartments, a first passage adapted to connect the front compartment to the space at the rear of the power piston, a second passage adapted to connect the rear compartment to the space in front of the power piston, a valve seat provided by the rear portion of the power piston, a valve element located between the rear portion of the power piston and the diaphragm and spring-urged toward the seat, a valve control member reciprocably mounted in the rear portion of the power piston and adapted to engage the valve element to cut off one passage and thereafter unseat the valve element to open a second passage, thereby controlling the operation of the power piston, means tending to prevent the diaphragm from exerting a reaction force during the initial portion of the applying stroke, and an operator operated rod, one end of which acts on the valve control member to control its movements and to add the force exerted by the operator to the force of the power piston acting on the pressure-transmitting member.

4. A pressure producing device, in which physical force is supplemented by power assistance, comprising a differential air pressure power cylinder, a piston reciprocable in the power cylinder, a pressure-transmitting member operatively connected to the power piston, said power piston being so constructed as to provide an internal reaction chamber, a reaction diaphragm which is adapted to provide a reaction effect in opposition to the operator's effort and which divides said chamber into front and rear compartments, a first passage adapted to connect the front compartment to the space at the rear of the power piston, a second passage adapted to connect the rear compartment to the space in front of the power piston, two valve seats provided by the rear portion of the power piston, two valve elements cooperating with the respective seats, and a valve control member reciprocably mounted in the rear portion of the power piston and connected to the two valve elements to successively seat one and unseat the other, thereby controlling the operation of the power piston, means tending to prevent the diaphragm from exerting a reaction force during the initial portion of the applying stroke, and an operator operated rod, one end of which acts on the valve control member to control its movements and to add the force exerted by the operator to the force of the power piston acting on the pressure-transmitting member.

5. A pressure producing device, in which physical force is supplemented by power assistance, comprising a differential pressure power cylinder, a pressure responsive movable wall in the power cylinder, a pressure-transmitting member operatively connected to the movable wall, said movable wall being so constructed as to provide an internal reaction chamber, a reaction diaphragm which divides said chamber into front and rear compartments, a first passage adapted to connect the front compartment to the space at the rear of the movable wall, a second passage adapted to connect the rear compartment to the space in front of the movable wall, a follow-up valve control member reciprocably mounted in the rear portion of the movable wall and arranged to control the operation of the movable wall, a counter-reaction spring which engages the rear of the diaphragm and the rear portion of the movable wall and which tends to prevent the diaphragm from exerting its reactionary force on the valve control member, and an actuating member, one end of which acts on the valve control member to control its movements and to add the force exerted by the operator to the force of the movable wall acting on the pressure-transmitting member.

6. A pressure producing device, in which physical force is supplemented by power assistance, comprising a differential pressure power cylinder, a pressure responsive movable wall in the power cylinder, a pressure-transmitting member operatively connected to the movable wall, said movable wall being so constructed as to provide an internal reaction chamber, a reaction diaphragm which divides said reaction chamber into front and rear compartments, a first passage adapted to connect the front compartment to the space at the rear of the movable wall, a second passage adapted to connect the rear compartment to the space in front of the movable wall, a follow-up valve control member reciprocably mounted in the movable wall and arranged to control the operation of the movable wall, a cushioning member carried by the diaphragm and interposed between the valve control member and the power piston, means tending to suppress the reaction force exerted by the diaphragm on the valve control member during the initial portion of the applying stroke, and an actuating member which acts on the valve control member to control its movements and to add the force exerted by the operator to the force of the movable wall acting on the pressure-transmitting member.

7. A pressure producing device, in which physical force is supplemented by power assistance, comprising a differential pressure power cylinder, a pressure responsive movable wall in the power cylinder, a pressure-transmitting member operatively connected to the movable wall, said movable wall being so constructed as to provide an internal reaction chamber, a reaction diaphragm which divides said reaction chamber into front and rear compartments, the front compartment being in communication with the space at the rear of the movable wall, and the rear compartment being in communication with the space in front of the movable wall, a valve control member reciprocably mounted in the movable wall and arranged to control the operation of the movable wall, said valve control member being operatively associated with the reaction diaphragm in such a way as to receive the reaction effect thereof, a counter-reaction spring which operatively engages the rear of the diaphragm and the rear wall of the reaction chamber and which tends to prevent the diaphragm from exerting its reactionary force on the valve control member, and an actuating member which acts on the valve control member to control its movements and to add the force exerted by the operator to the force of the movable wall acting on the pressure-transmitting member.

8. A pressure producing device, in which physical force is supplemented by power assistance, comprising a differential pressure power cylinder, a pressure responsive movable wall in the power cylinder, a pressure-transmitting member operatively connected to the movable wall, said movable wall being so constructed as to provide an internal reaction chamber, a reaction diaphragm which divides said reaction chamber into front and rear compartments, the front compartment being in communication with the space at the rear of the movable wall, and the rear compartment being in communication with the space in front of the movable wall, a valve control member reciprocably mounted in the movable wall and arranged to control the operation of the movable wall, said valve control member being adapted to operatively engage the reaction diaphragm, means for withholding at least part of the reaction effect of the diaphragm until a predetermined resistance has been encountered on the output side of the pressure producing device, and an actuating member which acts on the valve control member to control its movements and to add the force exerted by the operator to the force of the movable wall acting on the pressure-transmitting member.

9. A pressure producing device, in which physical force is supplemented by power assistance, comprising a differential pressure power cylinder, a pressure responsive movable wall in the power cylinder, a pressure-transmitting member operatively connected to the movable wall, said movable wall being so constructed as to provide an internal reaction chamber, a reaction diaphragm which divides said reaction chamber into front and rear compartments, the front compartment being in communication with the space at the rear of the movable wall, and the rear compartment being in communication with the space in front of the movable wall, a valve control member arranged to control the operation of the movable wall, a check valve which partially controls the pressure in one of the reaction chamber compartments to prevent a pressure differential from being developed on opposite sides of the reaction diaphragm until a predetermined pressure differential has been developed on opposite sides of the movable wall, and an actuating member which acts on the valve control member to control its movements and to add the force exerted by the operator to the force of the movable wall acting on the pressure-transmitting member.

10. A pressure producing device, in which physical force is supplemented by power assistance, comprising a differential pressure power cylinder, a pressure responsive movable wall in the power cylinder, a pressure-transmitting member operatively connected to the movable wall, said movable wall being so constructed as to provide an internal reaction chamber, a reaction diaphragm which divides said reaction chamber into front and rear compartments, the front compartment being in communication with the space at the rear of the movable wall, and the rear compartment being in communication with the space in front of the movable wall, a valve control member arranged to control the operation of the movable wall, a check valve which partially controls the pressure in one of the reaction chamber compartments to prevent a pressure differential from being developed on opposite sides of the reaction diaphragm until a predetermined pressure differential has been developed on opposite sides of the movable wall, means for rendering said check valve ineffective after a predetermined pressure differential has been developed, and an actuating member which acts on the valve control member to control its movements and to add the force exerted by the operator to the force of the movable wall acting on the pressure-transmitting member.

11. A pressure producing device, in which physical force is supplemented by power assistance, comprising a differential pressure power cylinder, a pressure-responsive fluid-displacing means including a movable wall in the power cylinder and a pressure-transmitting member operatively connected to the movable wall, a reaction member carried by said fluid-displacing means and arranged to exert a force proportional to that exerted by the fluid displacing means but in the opposite direction, a valve control member reciprocably associated with the movable wall to control the operation of the movable wall, said valve control member being adapted to operatively engage the reaction member, a spring which tends to hold the reaction member away from the valve control member and which neutralizes part of the reaction by transferring it to the movable wall, and an operator operated member which acts on the valve control member to control its movements and to add the force exerted by the operator to the force of the movable wall acting on the pressure-transmitting member.

12. A hydraulic pressure producing device, in which physical force is supplemented by power assistance, comprising a differential pressure power cylinder, a pressure-responsive fluid-displacing means including a movable wall in the power cylinder and a pressure-transmitting member operatively connected to the movable wall, a reaction member carried by said fluid-displacing means and arranged to exert a force proportional to that exerted by the fluid displacing means but in the opposite direction, a valve control member reciprocably associated with the movable wall to control the operation of the movable wall, said valve control member being adapted to operatively engage the reaction member, resilient means for withholding at least part of the reaction effect from the valve control member until a predetermined output pressure has been developed by the fluid-displacing means and an operator operated member which acts on the valve control member to control its movements and to add the force exerted by the operator to the force of the movable wall acting on the pressure-transmitting member.

13. A pressure producing device comprising a power cylinder, a pressure-developing means including a pressure responsive movable wall in the power cylinder, a reaction member carried by the pressure-developing means and arranged to exert a force proportional to the force exerted by the pressure-developing means but in the opposite direction, a valve control member reciprocably associated with the movable wall to control the operation of the movable wall, said valve control member being adapted to operatively engage the reaction member, a spring which tends to hold the reaction member away from the valve control member and which neutralizes part of the reaction by transferring it to the movable wall, and an operator operated member which acts on the valve control member to control its movements and to add the force exerted by the operator to the force exerted by the movable wall.

14. A pressure producing device comprising a power cylinder, a pressure-developing means including a pressure responsive movable wall in the power cylinder, a reaction member carried by the pressure-developing means and arranged to exert a force proportional to the force exerted by the pressure-developing means but in the opposite direction, a valve control member reciprocably associated with the movable wall to control the operation of the movable wall, said valve control member being adapted to operatively engage the reaction member, means for preventing at least part of the reaction effect of the reaction member on the valve control member until a predetermined resistance has been encountered on the output side of the pressure producing device, and an operator operated member which acts on the valve control member to control its movements and to add the force exerted by the operator to the force exerted by the movable wall.

15. A pressure producing device comprising a power cylinder, a pressure-developing means including a pressure responsive movable wall in the power cylinder, a reaction member carried by the pressure-developing means and arranged to exert a reaction force proportional to the force exerted by the pressure-developing means, a valve control member reciprocably associated with the movable wall to control the operation of the movable wall, said valve control member being adapted to operatively engage the reaction member, a spring which neutralizes part of the reaction by transferring it from the reaction member to the movable wall, and an operator operated member which acts on the valve control member to control its movements and to add the force exerted by the operator to the force exerted by the movable wall.

16. A pressure producing device comprising a power cylinder, a pressure-developing means including a pressure responsive movable wall in the power cylinder, a reaction member carried by the pressure-developing means and arranged to exert a reaction pressure proportional to the force exerted by the pressure-developing means, an operator operated valve control member reciprocably associated with the movable wall to control the operation of the movable wall, said valve control member being urged against the operator's force by the reaction member, and a spring which neutralizes part of the reaction by transferring it from the reaction member to the movable wall.

17. A pressure producing device comprising a power cylinder, a pressure-developing means including a pressure responsive movable wall in the power cylinder, a reaction member carried by the pressure-developing means and arranged to exert a reaction force proportional to the force exerted by the pressure-developing means, an operator operated valve control member reciprocably associated with the movable wall to control the operation of the movable wall, said valve control member being urged against the operator's force by the reaction member, and means for withholding at least part of the reaction effect from said control member until a predetermined output pressure has been developed by the pressure producing device.

18. A pressure producing device comprising a power cylinder, a pressure responsive movable wall in the power cylinder, a reaction member arranged to exert a reaction force proportional to the force exerted by the movable wall, an operator operated valve control member adapted to control the operation of the movable wall, said valve control member being urged against the operator's force by the reaction member, and a spring which keeps the operator from feeling the initial reaction force.

19. A pressure producing device comprising a power cylinder, a pressure responsive movable wall in the power cylinder, a reaction member arranged to exert a reaction force proportional to the force exerted by the movable wall, an operator operated control member adapted to control the operation of the movable wall, said operator operated control member being urged against the operator's force by the reaction member, and means for withholding at least part of the reaction effect from said control member until a predetermined output pressure has been developed by the pressure producing device.

20. A pressure producing device comprising a power cylinder, a pressure responsive movable wall in the power cylinder, a reaction member arranged to exert a reaction force varying with variations in the force exerted by the movable wall, an operator-operated control member adapted to control the operation of the movable wall, said control member being urged against the operator's force by the reaction member, and means for withholding at least part of the reaction effect from the control member during the initial portion of the applying stroke.

21. A pressure producing device comprising a power cylinder, a pressure responsive movable wall in said cylinder, reaction means arranged to exert a reaction force varying with variations in the force exerted by the movable wall, an operator-operated control member adapted to control the operation of the movable wall, said control member being urged against the operator's force by the reaction member, and resilient means functioning to prevent the operator from feeling the initial reaction force.

22. A hydraulic pressure producing device, in which physical force is supplemented by power assistance, comprising a power cylinder, a hydraulic cylinder mounted on one end of the power cylinder and having a pressure chamber, a pressure-responsive fluid-displacing means including a movable wall in the power cylinder and a pressure-transmitting member extending from the movable wall into the hydraulic pressure chamber, a reaction member carried by the fluid-displacing means and arranged to exert a force proportional to that exerted by the fluid-displacing means but in the opposite direction, valve means for controlling the movable wall, and means for transmitting the reaction effect of the reaction member to the operator, including means for withholding at least part of the reaction effect until a predetermined pressure has been developed in the hydraulic pressure chamber.

23. A pressure producing device comprising a power cylinder, a pressure responsive movable wall in said cylinder, a reaction means arranged to exert a reaction force which varies with variations in the force exerted by the movable wall, an operator-operated valve means for controlling the movable wall, means for transmitting the reaction force of said reaction means to the operator, and mechanism carried by the movable wall for neutralizing part of the reaction by transferring it from the reaction means to the movable wall.

24. A pressure producing device comprising a power cylinder, a pressure responsive movable wall in said cylinder, said wall being so constructed as to provide a reaction chamber, a reaction diaphragm in said chamber, an operator-operated reciprocable control member for controlling the operation of said wall, said control member receiving the reaction thrust exerted by said diaphragm and also the thrust incident to wall-moving force applied by an operator, and a cushioning member carried by the diaphragm and interposed between that portion of the control member which receives the thrust and the contiguous portion of the movable wall.

25. A pressure producing device comprising a power cylinder, a pressure responsive movable wall in said cylinder, said wall being so constructed as to provide a reaction chamber, a reaction diaphragm in said chamber, a reciprocable operator-operated valve control member for controlling the operation of said wall, a counter-reaction spring tending to urge the diaphragm away from said valve control member, said member receiving the reaction thrust exerted by said diaphragm and also the thrust incident to wall-moving force applied by an operator, and a cushioning member carried by the diaphragm and interposed between that portion of the valve control member which receives the thrust and the contiguous portion of the movable wall.

References Cited in the file of this patent

UNITED STATES PATENTS

| Number | Name | Date |
|---|---|---|
| 1,846,023 | Bragg et al. | Feb. 23, 1932 |
| 1,978,667 | Breese | Oct. 30, 1934 |
| 2,006,487 | Sorensen | July 2, 1935 |
| 2,165,942 | Rossmann | July 11, 1939 |
| 2,197,075 | Fitzgerald | Apr. 16, 1940 |
| 2,241,374 | Alfieri | May 13, 1941 |
| 2,305,638 | Rockwell | Dec. 22, 1942 |
| 2,307,910 | Baade | Jan. 12, 1943 |
| 2,395,223 | Ingres | Feb. 19, 1946 |
| 2,458,803 | Stelzer | Jan. 11, 1949 |
| 2,517,005 | MacDuff | Aug. 1, 1950 |
| 2,532,960 | Stelzer | Dec. 5, 1950 |
| 2,552,033 | Bradbury | May 8, 1951 |
| 2,552,048 | LaBrie | May 8, 1951 |
| 2,592,221 | Whitted | Apr. 8, 1952 |
| 2,596,242 | Hill | May 13, 1952 |

FOREIGN PATENTS

| Number | Country | Date |
|---|---|---|
| 668,388 | France | July 9, 1929 |
| 747,273 | France | Mar. 28, 1933 |